(No Model.)
H. A. HUGHES.
HAME.
No. 334,775. Patented Jan. 26, 1886.
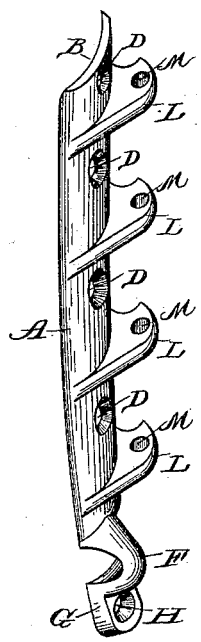
Fig. 1.
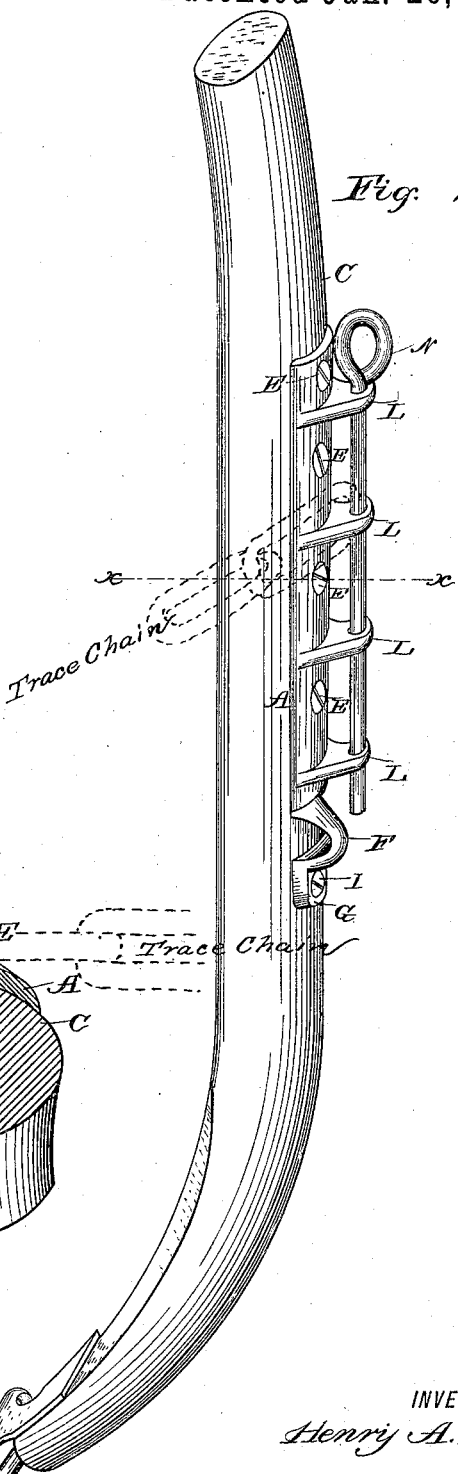
Fig. 2.
Fig. 3
WITNESSES
Percy C. Bowen
J. W. Garner
INVENTOR
Henry A. Hughes.
By his Attorneys
C. A. Snow & Co.

UNITED STATES PATENT OFFICE.

HENRY A. HUGHES, OF COLLINSVILLE, TEXAS.

HAME.

SPECIFICATION forming part of Letters Patent No. 334,775, dated January 26, 1886.

Application filed May 19, 1885. Serial No. 166,002. (No model.)

*To all whom it may concern:*

Be it known that I, HENRY A. HUGHES, a citizen of the United States, residing at Collinsville, in the county of Grayson and State of Texas, have invented a new and useful Improvement in Hames, of which the following is a specification, reference being had to the accompanying drawings.

My invention relates to an improvement in hame attachments; and it consists in an attachment provided with a series of lugs or hooks for the attachment of the link of the chain trace or the eye of the tug, whereby the draft may be attached to the hame attachment at any desired point, said attachment being adapted to be secured to a hame of the ordinary construction, as will be more fully set forth hereinafter.

In the accompanying drawings, Figure 1 is a detail perspective view of a hame attachment embodying my invention. Fig. 2 is a similar view of a hame with my attachment applied thereto. Fig. 3 is a transverse sectional view taken on the line $x\ x$ of Fig. 2.

A represents a hame attachment, which is preferably constructed of malleable iron, and is concaved on its inner side, as at B, and thereby adapted to fit over the outer convex surface of an ordinary hame, C. A series of openings, D, is made in the hame attachment, through which screws E may be passed in order to secure the attachment to the hame. The lower end of the hame attachment is provided with a hook or goose-neck, F, which forms an eye for the attachment of the ring of a breast-strap. An ear, G, projects vertically from the lower end of the goose-neck, and forms an extension of the hame attachment, and in this ear is made an opening, H, adapted for a screw, I.

L represents a series of hooks or shoulders which project out from the outer side of the hame attachment, and these shoulders serve for the attachment of the link of the chain trace or the eye of a tug. The front sides of these hooks extend outwardly and forwardly from the body of the attachment, as shown at *l*, Fig. 3, and thereby cause the trace-chain to work against the body of the attachment, and thus have no tendency to slip off the hook when drawing a load, and thus relieve the rod N of all strain. An opening, M, is made in the outer end of each of the hooks L, and down through these openings is passed a wire or bolt, N, which serves to keep the trace or tug from becoming detached from the hook to which it is secured. By reason of the series of hooks L, it will be readily understood that the draft may be shifted either up or down on the hame, and thereby adjusted to the height of the draft-animal, and in the event of a sore shoulder the attachment will be shifted, so as to prevent the strain from bearing on the sore part and shift it to the sound part of the animal's shoulder.

Heretofore when the hook of an ordinary hame has become broken it has rendered the hame valueless.

My attachment is adapted to be secured to an ordinary hame, and thus provides a series of new hooks therefor, and thereby saves the hame.

I am aware that it has been heretofore proposed to construct hame attachments with projecting lugs having aligned openings and a bolt that passes vertically through the openings and through a link of the trace-chain, and this construction I disclaim. My invention differs from this, in that my attachment is provided with a series of projecting hooks for the attachment of the trace-chain, the bolt or wire passing through the aligned openings in the hooks on the outer side of the trace-chain, and not through said chain, the sole purpose of the bolt or wire being to prevent the chain from slipping off the hook, as hereinbefore stated. When the bolt is passed through a link of the trace-chain, all the strain must be borne by the bolt, which frequently results in bending the bolt and rendering it impossible to withdraw it from the eyes of the projections when it is desired to detach the chain, while by my construction all the strain on the trace-chain is borne by the hook to which it is attached, without in any manner affecting the bolt or wire.

Having thus described my invention, I claim—

The hame attachment, preferably concave on its inner side, having the projecting hooks L, for the attachment of the chain trace, said hooks having the aligned openings M, and the bolt or wire N, adapted to pass through the openings to prevent the trace-chain from slipping off the hook to which it is attached, substantially as described.

In testimony that I claim the foregoing as my own I have hereto affixed my signature in presence of two witnesses.

HENRY A. HUGHES.

Witnesses:
ELIJAH MILLER,
J. C. MCGHEE.